Oct. 24, 1933.
M. I. BARTHELL, NOW BY DECREE OF COURT M. I. GAULT
1,932,385
AGITATOR ATTACHMENT
Filed July 27, 1931
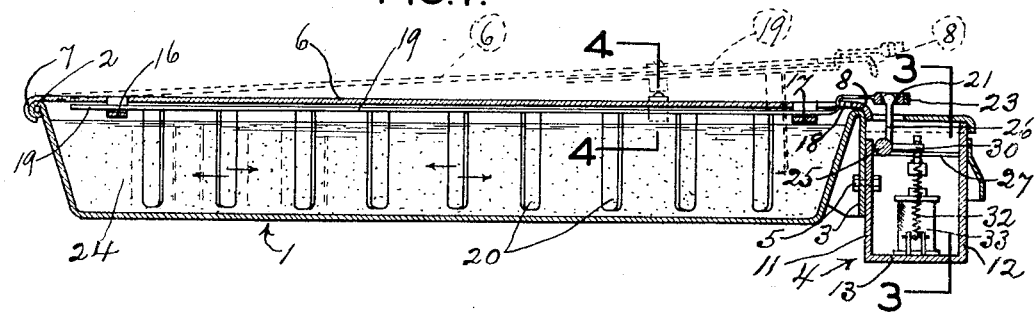
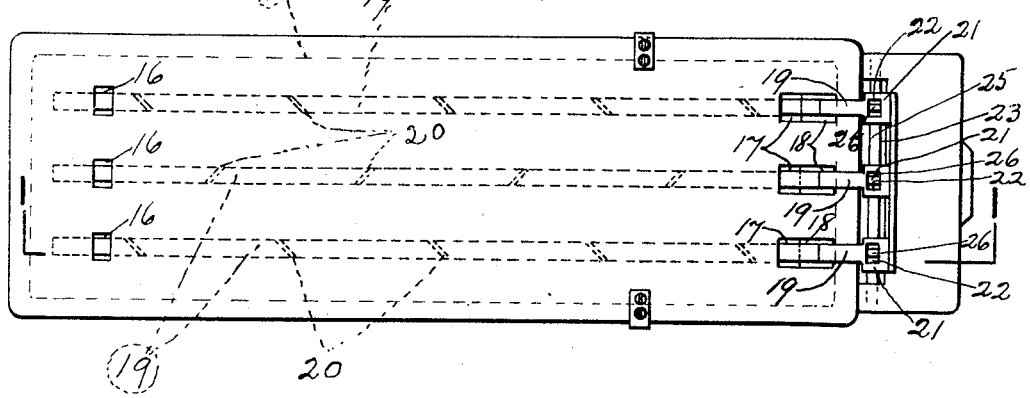
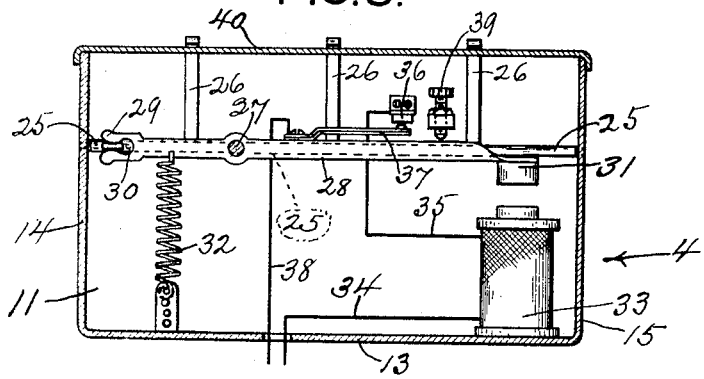
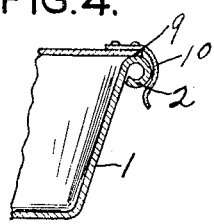
Mildred I. Barthell
INVENTOR
BY Loyal G. Miller
ATTORNEY Patented Oct. 24, 1933

1,932,385

UNITED STATES PATENT OFFICE 1,932,385

AGITATOR ATTACHMENT

Mildred I. Barthell, Oklahoma City, Okla.; now, by decree of court, Mildred Irene Gault Application July 27, 1931. Serial No. 553,400

3 Claims. (Cl. 259—113)

My invention relates to mechanical agitators for liquids, and more particularly to an agitator attachment for the freezing pans of mechanical refrigerators.

The objects of my invention are to provide a device of this class which is new, novel, practical and of utility; which may be easily and quickly attached to the usual freezing pans of a mechanical refrigerator; the agitating mechanism of which may be quickly and easily removed from the pan when not in use; which will be sufficiently compact so that when it is installed on the pan it can be used in the usual freezing compartment of the refrigerator without difficulty; the agitating mechanism of which may be easily removed from a frozen commodity; which will be durable; which will agitate the liquid to move in varying directions; which will be comparatively cheap to manufacture; and, which will be efficient in accomplishing all the purposes for which it is intended.

With the advent of mechanical refrigerators in the home, the home manufacture of frozen desserts such as ices, ice cream, custards and the like has materially increased. The usual freezing pan of the refrigerator is generally used as a container for the commodity to be frozen and considerable inconvenience is encountered in removing the pan frequently to stir the commodity during the freezing process, and when frozen it has evidence of being frozen to a solid and not having been sufficiently stirred during the freezing process.

Applicant's device is primarily designed for home use on the usual equipment of mechanical refrigerators.

With these and other objects in view as will more fully appear, my invention consists in the construction, novel features, and combination of parts hereinafter more fully described, pointed out in the claims hereto appended, and illustrated in the accompanying one-sheet drawing, of which:

Fig. 1 is a vertical sectional view of a usual freezing pan equipped with the device;

Fig. 2 is a top view of the same showing the agitators in dotted lines;

Fig. 3 is a sectional view taken along the line 3—3 of Fig. 1; and,

Fig. 4 is a fragmentary sectional view taken along the line 4—4 of Fig. 1.

Like characters of reference designate like parts in all the figures.

It is understood that various changes in the form, proportion, size, shape, weight and other details of construction, within the scope of my invention may be resorted to without departing from the spirit of broad principle of my invention and without sacrificing any of the advantages thereof; and it is also understood that the drawing is to be interpreted as being illustrative and not restrictive.

One practical embodiment of the invention as illustrated in the drawing follows:

The reference numeral 1 indicates a usual freezing pan as a whole. Said pan 1 is usually equipped with a beaded upper rim 2 around its orifice except at the front end, where the material forming the front end of the pan is bent downwardly to form a lip 3. The usual freezing pan is not provided with a lid, but the front face of the lip 3 is provided with a rectangular plate or door, not shown, for closing the front opening of the usual freezing chamber when the pan is inserted therein.

Applicant's device is designed for attachment to and use upon a pan of the type hereinabove described, and consists substantially of a small metal housing or box 4, having sides 11 and 12, a bottom 13, and ends 14 and 15, said box 4 is attached to said lip 3 by a plurality of bolts through said side 11, one of which is indicated by the reference numeral 5. A removable lid 6 is provided for said pan 1, and said lid 6 is constructed with a downwardly curved end 7 for engaging the rim 2 at the rear end of said pan 1, and downwardly curved front end 8 which rests upon and slightly engages the upper portion of said lip 3. The side edges of the lid are straight as shown at 9 and are provided with oppositely disposed spring clips 10 which engage the rim 2 of the sides of said pan 1. It may be seen that by first hooking the curved end 7 of the lid 6 over the rim 2 at the rear end of the pan, and then pressing downwardly upon the front portion of the lid, said clip 10 will be hooked over the side rims of the pan, and the lid will then have been effectually positioned on the pan.

The nether surface of said lid 6 is provided adjacent its rear end with a plurality of spaced, depending hangers or loops 16 and adjacent its front end has a like plurality of similarly spaced hangers 17 adjacent each of which is a rectangular opening 18. Slidably supported by each alined pair of said hangers 16 and 17 is provided a metal rod or strap 19 having spaced depending fingers 20. At their front end portions each of said rods 19 are bent upwardly and pass through one of said openings 18, after which they are again bent into a horizontal position and extend along said lid 6 past the front end thereof and over said box 4. The extreme front end of each of said rods 19 is provided with an enlargement 21 having a rectangular perforation 22 therethrough. Said enlargements 21 are all rigidly connected together by a cross-bar 23 which acts as a means of holding said rods 19 in parallel spaced relation.

It may be seen that longitudinal reciprocation of said rods 19 will cause said fingers 20 to agitate any liquid, which is indicated as 24, within said pan 1, and that by lifting said lid 6 the fingers can easily be withdrawn from the liquid 24 after it has been frozen.

Said fingers 20 are disposed at an angle to the axes of said rods 19 so that when the rods are reciprocated longitudinally an arcuate circulation will be imparted to the liquid 24. Also fingers 20 on one rod 19 are preferred to be staggered with relation to the fingers 20 of the next adjacent rod 19, and the fingers 20 of each next adjacent respective rod are preferably pointed in a different direction from the fingers on the next adjacent rod thereto, for the purpose of agitating the liquid in different directions. I do not, however, wish to be limited to their use in this way.

Within said box 4 is housed the mechanism for reciprocating the rod 19. This mechanism consists substantially of a horizontal rod or shaft 25 journaled in the box ends 14 and 15. Said shaft 25 is disposed substantially beneath said perforations 22 in the enlargements 21 on the front ends of said rods 19. Rigidly upstanding from said shaft 25, and each directly beneath one of said perforations 22 is provided a plurality of crank-arms 26, the upper end of each of which is engaged within one of said perforations 22.

Journaled between the box sides 11 and 12 is provided a shaft 27, upon which is rigidly mounted a rocker arm 28, one end of which is bifurcated to form a yoke 29 for pivotally engaging one end of a crank-arm 30, the other end of which is rigidly attached to said shaft 25. Said shaft 25, crank-arms 26 and said crank-arm 30 form a bell-crank. The free end of said rocker arm 28 is equipped with a depending electrical contact point 31. One end of a retrieving spring 32 is connected to said rocker arm 28 adjacent said yoke 29 and its other end is adjustably connected to the bottom 13 of said box 4.

It may be understood from the description thus far that any vertical reciprocation of the contact point end of said rocker arm 28 will through the action of said yoke 29, crank-arm 30, shaft 25, and crank-arms 26, impart a longitudinal reciprocation to said rods 19. This vertical reciprocation is obtained through the electrical equipment next described.

Within said box 4 and directly beneath said contact point 31 is provided an electro-magnet 33 having lead in wires 34 and 35. Said wire 35 is connected to a contact point 36 which is rigidly attached to the side 11 of the box and extends outwardly therefrom over said rocker arm 28. The upper face of said rocker arm 28 is equipped with a spring contact 37 which in turn is connected to a lead in wire 38. Said wires 34 and 38 lead from a seat of electrical energy, not shown.

It may be seen that when the contacts 37 and 36 are in contact the magnet 33 will be energized, and will draw the free end of said rocker arm 28 downwardly thus breaking the electrical connection between said contacts 37 and 36, thus de-energizing the magnet and releasing the rocker arm to the action of said spring 32 which will immediately force the free end of the rocker arm upward and again energize the magnet by making connection between said contacts 37 and 36.

An adjustable thumb-bolt 39 is provided above said rocker arm 28 for adjustably limiting its throw. A lid 40 is provided for covering said box 4.

It may be seen that should the liquid indicated at 24 become frozen sufficiently hard to prevent the reciprocal movement of said fingers 20 therein, said contacts 37 and 36 might be continuously held together and damage to the magnet would result. In order to overcome this likelihood, I prefer that said spring contact 37 be made of two different materials, each having a different coefficient of expansion so that when over-heated the contact 37 will spring out of connection with said contact 36.

Due to the fact that the operation of the device has been somewhat thoroughly described hereinabove, it is not deemed necessary to go into its description more fully.

Attention is directed to the fact, however, that said enlargements 21 merely fit over said crank-arms 26 and can easily be withdrawn therefrom when the lid 6 is removed from the pan.

Obviously, the invention is susceptible of embodiment in forms other than that which is illustrated in the accompanying drawing and described herein, and applicable, for uses and purposes other than as detailed, and I therefore consider as my own all such modifications and adaptations and other uses of the form of the device herein described as fairly fall within the scope of my invention.

Having thus described my invention, what is claimed and desired to be secured by Letters Patent, is:

1. In a device of the class described, the combination with a usual ice tray of an iceless refrigerator, of a removable lid adapted to be rigidly disposed upon and cover said tray, a separate compartment carried by one end of said tray, a plurality of longitudinal members slidably carried by the nether surface of said lid and having a plurality of perpendicular depending tines carried thereby, and electrically operated mechanism carried by said separate compartment for longitudinally reciprocating said members, said mechanism comprising an electromagnet, a rocker arm, one end of which is adapted to be drawn into contact with said magnet, a retrieving spring connected to the other end of said rocker arm, a bell-crank connecting said rocker arm and said rods, and electrical connections whereby the magnet is energized and de-energized by the action of said rocker arm.

2. Organization as described in claim 1, and means for breaking said electrical connections when undue strain causes the longitudinal members to remain stationary.

3. In an electric actuator, the combination with a usual ice tray of an iceless refrigerator, of a removable lid adapted to be rigidly clamped upon and to cover said tray, a plurality of longitudinal members having a plurality of depending tines, said members slidably carried by the nether surface of said lid and having a protrusion extending past one end of said tray, a separate compartment carried by the last mentioned end of the tray, an electro-magnet within said compartment, a rocker-arm one end of which is adapted to be drawn into contact with said magnet when the magnet is energized, a retrieving means connected to the other end of said rocker-arm, a pivotally mounted bell-crank having one leg connected to said rocker-arm and having its other leg connected to said protrusion, and electrical connections whereby the magnet is energized and de-energized by the action of said rocker-arm.

MILDRED I. BARTHELL.